(12) United States Patent
Pul

(10) Patent No.: US 11,655,025 B2
(45) Date of Patent: May 23, 2023

(54) LIGHT WEIGHT FLYING CAR PPRW

(71) Applicant: George Pul, Las Vegas, NV (US)

(72) Inventor: George Pul, Las Vegas, NV (US)

( * ) Notice: Subject to any disclaimer, the term of this patent is extended or adjusted under 35 U.S.C. 154(b) by 472 days.

(21) Appl. No.: 16/916,076

(22) Filed: Jun. 29, 2020

(65) Prior Publication Data
US 2021/0403156 A1 Dec. 30, 2021

(51) Int. Cl.
*B64C 37/00* (2006.01)
*B64C 3/14* (2006.01)
*B64C 11/02* (2006.01)
*B60F 5/02* (2006.01)
*B64D 35/04* (2006.01)

(52) U.S. Cl.
CPC ............ *B64C 37/00* (2013.01); *B60F 5/02* (2013.01); *B64C 3/14* (2013.01); *B64C 11/02* (2013.01); *B64D 35/04* (2013.01)

(58) Field of Classification Search
CPC ..... B60F 5/02; B64C 3/10; B64C 3/14; B64C 11/02; B64C 11/16; B64C 11/18; B64C 11/20; B64C 37/00; B64C 11/46; B64C 11/48; B64C 11/50; B64C 39/003; B64C 39/005; B64C 39/006; B64C 39/008; B64D 35/04
USPC ...................................................... 244/9, 10
See application file for complete search history.

(56) References Cited

U.S. PATENT DOCUMENTS

| 4,210,299 | A | * | 7/1980 | Chabonat | B64C 39/005 |
| | | | | | 416/111 |
| 4,398,895 | A | * | 8/1983 | Asker | B63H 9/02 |
| | | | | | 416/4 |
| 6,007,021 | A | * | 12/1999 | Tsepenyuk | B64C 29/0033 |
| | | | | | 416/126 |
| 6,465,899 | B2 | * | 10/2002 | Roberts | F03D 3/0427 |
| | | | | | 415/4.2 |
| 6,845,940 | B2 | * | 1/2005 | Hashimoto | B64C 39/008 |
| | | | | | 244/19 |
| 7,329,965 | B2 | * | 2/2008 | Roberts | F03D 13/20 |
| | | | | | 290/55 |
| 8,240,977 | B2 | * | 8/2012 | Gornatti | F03D 3/0409 |
| | | | | | 415/4.2 |
| 10,774,807 | B2 | * | 9/2020 | Pul | F03D 3/061 |

(Continued)

*Primary Examiner* — William V Gilbert

(57) ABSTRACT

Flying Car PPRW (Pipe Prop Rotary Wing) of the present invention transforms a road legal car into a true flying car for travels on and off roadways as well as travels in airways. Flying Car PPRW is mounted on top, powered from below, and has a smaller footprint of the road legal car for unrestricted roadway travels. Flying Car PPRW incorporates a general PPRW documented in patent application Ser. No. 16/128,537 filed on Sep. 12, 2018; and both Flying Car PPRW and the general PPRW are each a propeller driven propulsion engine in a pipe profile with props or propellers rotating in part as rotary wings. Flying Car PPRW enhances propulsion performances through the shaping of airflow field patterns around props and by the increased relative airflow velocities between props of interacting planet and sun airfoils. The PPRW props in rotations propels directional air for lift and thrust forces transversely through and across the pipe along the length of the pipe; and when vectored, the air thrust and lift forces are turned into variable lift and thrust forces for takeoffs, landings, and air flights of the true flying car travelling in airways.

1 Claim, 2 Drawing Sheets

(56) References Cited

U.S. PATENT DOCUMENTS

| | | | |
|---|---|---|---|
| 2011/0024558 A1* | 2/2011 | Blevio, Sr. | B64C 29/0025<br>244/103 R |
| 2014/0048657 A1* | 2/2014 | Lin | B64C 29/0025<br>244/23 A |
| 2020/0079496 A1* | 3/2020 | Pul | B64C 11/28 |
| 2020/0358344 A1* | 11/2020 | Marcel | B64C 11/001 |

* cited by examiner

LIGHT WEIGHT FLYING CAR PPRW

FIELD

The present invention of a Light Weight Flying Car PPRW (Pipe Prop Rotary Wing) relates generally to transforming an external heavy road legal car travelling on and off roadways into an aircraft for travelling in airways. And more particularly, the present invention relates to the Light Weight Flying Car PPRW in a pipe profile, mounted on top, powered from below, and having a smaller footprint than the external heavy road legal car below, where, the Light Weight PPRW props or propellers are rotating in part as rotary wings and oriented lengthwise along the pipe.

BACKGROUND OF THE INVENTION

A car is a modern day wonder for travelling on and off surface roadways. After many attempts to build and demonstrate flying cars, it remains much a vision to date of having a true flying car for travels on and off roadways as well as in airways. Light Weight Flying Car PPRW (Pipe Prop Rotary Wing) of the present invention is mounted on top, powered and having a smaller footprint than an external heavy road legal car below, to bring the vision of a true flying car into reality by transforming an external heavy road legal car into a true flying car. Light Weight Flying Car PPRW is derived from and incorporates a general PPRW documented in patent application Ser. No. 16/128,537 filed on Sep. 12, 2018. Light Weight Flying Car PPRW, like the general PPRW, is a propeller driven propulsion engine in a pipe profile with props or propellers rotating in part as rotary wings lengthwise along the pipes. Light Weight Flying Car PPRW is light weight and enhances propulsion performances compared to the general PPRW by being powered from the external heavy road legal car below and by shaping of airflow field patterns and having changing relative airflow velocities around and between props of interacting planet and sun airfoils. Light Weight Flying Car PPRW props in rotations propels directional lift and thrust airflows for lift and thrust forces transversely through, across, and along the length of the pipe; and when vectored, the air propelled lift and thrust forces are turned into variable lift and thrust forces for takeoffs, landings, and air flights of the true flying car travelling in airways.

SUMMARY OF THE INVENTION

Light Weight Flying Car PPRW is derived from and incorporates a general PPRW documented in patent application Ser. No. 16/128,537 filed on Sep. 12, 2018. Light Weight Flying Car PPRW, like the general PPRW, is a propeller driven propulsion engine in a pipe profile with props or propellers rotating in part as rotary wings lengthwise along the pipes, but is modified for applications on flying cars. Light Weight Flying Car PPRW, having a smaller footprint mounted on an external heavy road legal car below, transforms the external heavy road legal car into a true flying car for travelling freely on roadways just like any other road legal car, as well as travelling in airways for an aircraft. Light Weight Flying Car PPRW promotes structural stabilities of the true flying car by keeping total weight of the true flying car down low close to the ground, and by having a streamlined pipe profile of the Light Weight Flying Car PPRW for reduced sideway air resistance forces. The Light Weight Flying Car PPRW has enhanced propulsion performances compared to the general PPRW by means of shaping contoured airflow field patterns and increased relative airflow velocities around and between props of interacting planet and sun airfoils. Light Weight Flying Car PPRW, like the general PPRW, has props rotating in part as rotary wings along the length of the pipe to propel directional air for lift and thrust forces transversely through and across the pipe along the length of the pipe; and when vectored, the thrust and lift forces are turned into variable lift and thrust forces for takeoffs, landings, and air flights of the true flying car travelling in airways.

Light Weight Flying Car PPRW, a propeller driven propulsion engine, is comprised of paired PPRW main-assemblies powered from below and mounted on top of an external heavy road legal car with an external heavy powerful engine assembly of engine, transmission, fuel, control, and other systems. The external heavy road legal car and external heavy powerful engine assembly are external and not part of the Light Weight Flying Car PPRW. Light Weight Flying Car PPRW, a prop or propeller driven propulsion engine in a pipe profile, has a smaller footprint than the external heavy road legal car, for transforming the external heavy road legal car into a true flying car travelling on roadways and in airways. The paired PPRW main-assemblies are two PPRW main-assemblies separated by a primary mid plane. The paired PPRW main-assemblies are on + and −Y side, given the Light Weight Flying Car PPRW has X-Y-Z coordinate system, where X-Z plane lies in the primary mid plane, +X axis points aft ward, +Z axis up, −Z axis down toward ground, and +Y axis is a horizontal radial line connecting two stationary central shafts of the paired PPRW main-assemblies and orthogonal to X-Z axes. The paired PPRW main-assemblies on + and −Y side are same as two PPRW main-assemblies having one on +Y side and one on −Y side. The paired PPRW main-assemblies on + and −Y side, respectively and correspondingly and concentrically, are in turn comprised of one paired sun rotor main-assemblies, one paired planet rotor main-assemblies, and one paired end mounting main-assemblies.

The paired sun rotor main-assemblies on + and −Y side are each consisted of multiple paired outer and inner sun rotor sub-assemblies mounted on a pair of sun rotor end plates, and each of a paired outer and inner sun rotor sub-assemblies is in turn consisted of one sun rotating shaft, multiple sun airfoils, and one pair of sun drive sprockets. Paired outer and inner sun rotor sub-assemblies are separated by a secondary mid plane, aligned horizontally side by side on a line parallel to the Y axis, and are respectively further away from and closer to the Z axis. The sun rotating shaft and the multiple sun airfoils extend in between the pair of sun rotor end plates with the multiple sun airfoils fixed attached along and equally spaced in rotations around the sun rotating shaft, and the pair of sun rotor end plates fixed attached to the sun rotating shaft. The sun rotating shaft extending further out the paired sun rotor end plates in between and providing fixed supports to the paired sun drive sprocket. Sun airfoils are curved segments in shape similar to a semi circle for high drag airfoils; and their semicircle chords are on radial lines from the sun rotating shaft. Sun airfoils in rotations around the sun rotation shaft are rotational images of one another. Each of the paired outer and inner sun rotor sub-assemblies have appearances of pipes in profile oriented lengthwise along the X axis.

The paired planet rotor main-assemblies on + and −Y side are each consisted of multiple orbiting planet rotor sub-assemblies mounted on a pair of planet rotating end carrier plates. Each of the orbiting planet rotor sub-assemblies is in turn consisted of a planet rotating shaft, a planet airfoil, and a pair of planet drive sprockets. The multiple orbiting planet rotor sub-assemblies on + and −Y side are equally spaced in a concentric orbital rotation around the paired sun rotor main-assemblies on + and −Y side, respectively. The planet rotating shaft and the planet airfoil are extending in between the pair of planet rotating end carrier plate with the planet airfoil fixed attached along and in rotations around the planet rotating shaft, and the planet rotating shaft fixed attached to the pair of planet rotating end carrier plate. The planet rotating shaft extends further out in between and fixed supporting the pair of planet drive sprocket. The planet airfoil rotating with the planet rotor sub-assembly are translational images in the concentric orbital rotations. The planet airfoil in a frontal view is a curved segment having a shape similar to a large portion of a semi-circle curved segment for a hybrid high lift and drag airfoil. The planet airfoil, when rotated to have its concave surface persistently faces −Z downward, and its curved segment chord rotated horizontal on the Y axis, it has an equivalent curved center point on a center line below the Y axis; and the planet airfoil curved segment chord width is substantially wider than the sun airfoil chord width. Each of paired planet rotor main-assemblies and multiple orbiting planet rotor sub-assemblies have appearances of pipes in profiles along the X axis.

The paired end mounting main-assemblies on + and −Y side are each consisted of one stationary central shaft, one shared pair of grounding plates, and one pair of gear box and drive assembly for a total of two stationary central shafts, one shared pair of grounding plates, and two pairs of gear box and drive assemblies. The stationary central shaft extends in between and fixed attached to the pair of sun rotor end plates supporting the paired sun rotor main-assemblies. Beyond the pair of sun rotor end plates, the stationary central shaft extends in between and attaches by rotational joints to the pair of planet rotating end carrier plates of paired planet rotor main-assemblies. Next, the stationary central shaft extends in between and fixed attached to the paired gear box and drive assemblies. Further beyond, the stationary central shaft extends in between and fixed attached to the shared pair of grounding plates mounted on the external heavy road legal car below. The gear box and drive chain assembly connects the paired PPRW main-assemblies through the sun and planet drive sprockets to and transmits and controls powers from the external heavy powerful engine assembly below for powering and controlling the Light Weight Flying Car PPRW.

Light Weight Flying Car PPRW, mounted on top of the external heavy road legal car below, has means to be powered and controlled through the external heavy powerful engine assembly below that includes engine, transmission, fuel, and control systems. Light Weight Flying Car PPRW also has other means and provisions, such as a gear box and drive assembly, to cooperate with the external heavy powerful engine assembly below for power transmissions and controls. Airflow patterns shaped by interacting sun and planet airfoils are controlled by such means as flow gates, diverters, ducts, and funnels as appropriate. These and other means and provisions required for the Light Weight Flying Car PPRW are neither novel nor unique, and are not further described.

In operations, the Light Weight Flying Car PPRW, a propeller driven propulsion engine, is mounted on top and powered by the external powerful engine assembly of the external heavy road legal car below, in transforming the external heavy road legal car into a true flying car. The gear box and drive assembly connects and transmits powers from the external heavy powerful engine assembly below to the sun drive sprockets and the planet drive sprockets of the Light Weight Flying Car PPRW, setting in motions the paired sun rotor main-assemblies, the paired planet rotor main-assemblies, and the paired end mounting main-assemblies.

The sun and planet airfoils, being powered, are set in rotational motions interacting with one another, where the paired sun rotor main-assemblies generate swirling wind of a contoured airflow field patterns for the orbiting paired planet rotor main-assemblies to rotate through, with the planet airfoils at times in orbital rotations and counter-rotations around sun airfoils for greatly increased and decreased planet airfoils relative airflow velocities to maximize propulsion performances of the Light Weight Flying Car PPRW. Light Weight Flying Car PPRW has a smaller footprint than the external heavy road legal car below; and with sufficient clearances between them, propelled directional air for thrust and lift forces flow smoothly downward and around the external heavy road legal car below.

Light Weight Flying Car PPRW, a propeller driven propulsion engine, produces great propulsion performances by shaping airflow fields of sun airfoils and changing relative airflow velocities of interacting sun and planet airfoils. The propulsion performances are overwhelmingly dominated by the performances of high lift and drag hybrid planet airfoils, rotating in part as rotary wings, and having much larger planet airfoils orbiting at a much greater radius than sun airfoils in generating propelled air for thrust and lift forces. Sun and planet airfoils, interacting in rotations, propel air for thrust and lift forces transversely through and across the pipe profiles along the length of the Light Weight Flying Car PPRW. When vectored, the propelled air for thrust and lift forces are turned into variable lift and thrust forces for takeoffs, landings, and air flights of the true flying car travelling in the airways.

DESCRIPTION OF THE PREFERRED EMBODIMENT

Light Weight Flying Car PPRW (Pipe Props Rotary Wing) of the present invention, a prop driven propulsion engine in a pipe profile, is disclosed by a preferred embodiment, which is a simplified Light Weight Flying Car PPRW to show with clarity its features and advantages for been powered to propel air for thrusts and lifts forces. These and other features and advantages of the present invention will become more apparent to one skilled in the art from the following description and claims when read in light of the accompanying drawings for the preferred embodiment of a simplified present invention.

Unless otherwise apparent, or stated, directional references, such as "inner," "inward," "outer," "outward," "downward," "upper", "lower" etc., are for non-limiting descriptive purposes and intended to be relative to the orientation of a particular Light Weight Flying Car PPRW of the present invention as shown in the view of that apparatus. Parts shown in a given FIGURE are generally proportional in their dimensions; parts shown or omitted in a given FIGURE are intended generally for clarity; and where appropriate, main- and sub-assemblies having general appearances of pipes are shown as pipes in profiles.

Figure 1:
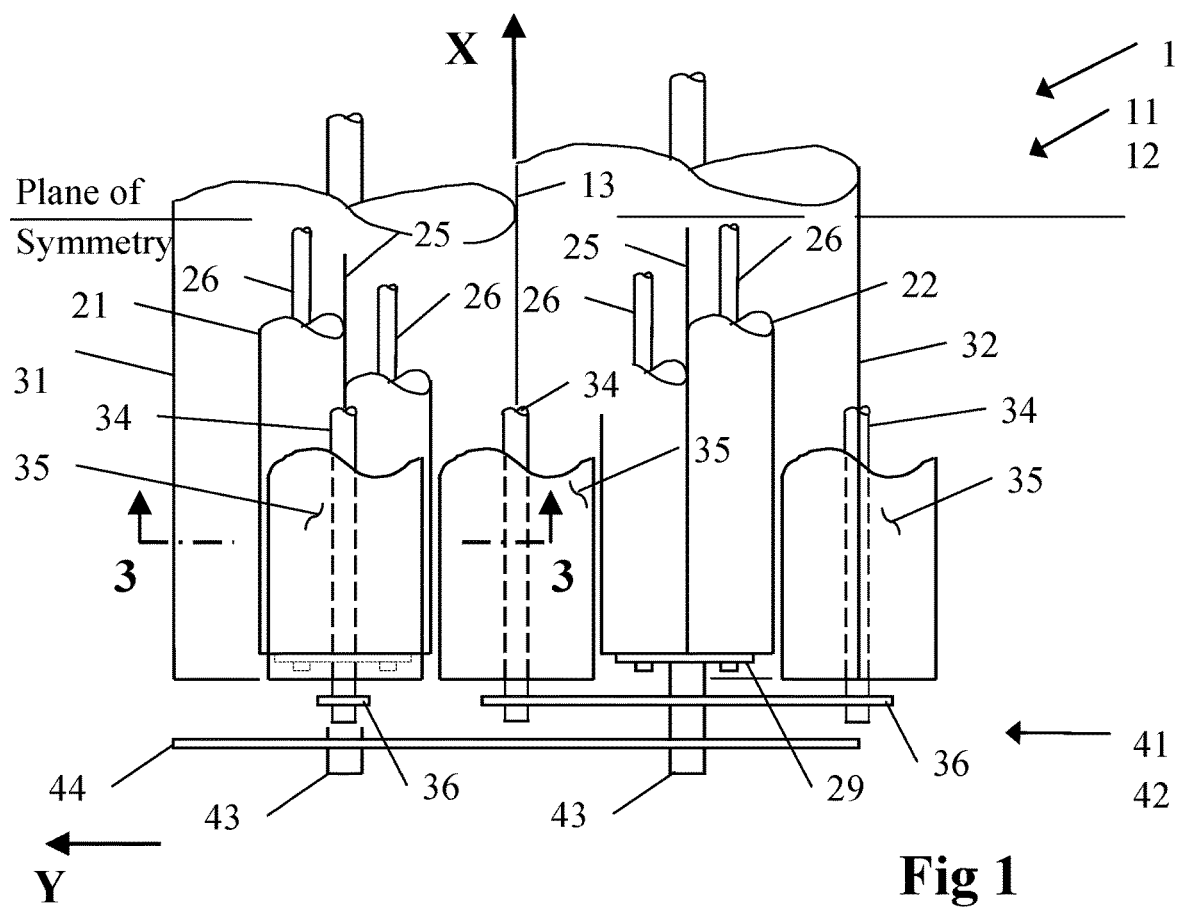
FIG. 1 is a plan view of the preferred embodiment of the present invention.
Figure 2:
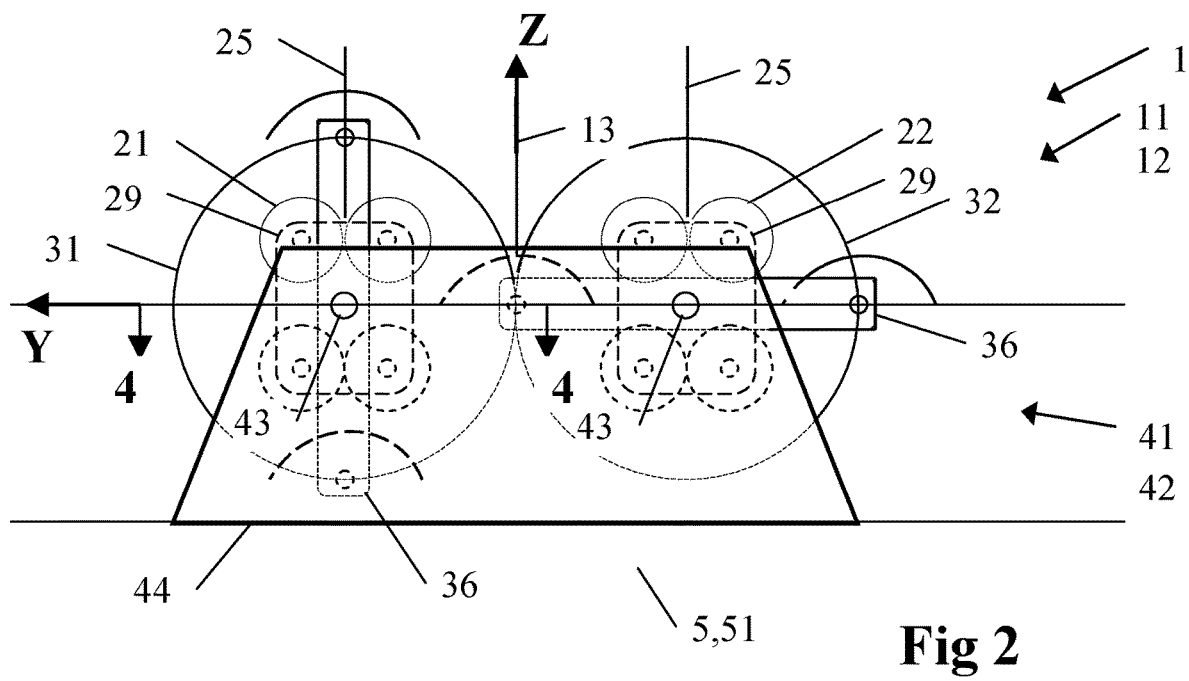
FIG. 2 is a front view of the preferred embodiment of the present invention.
Figure 3:
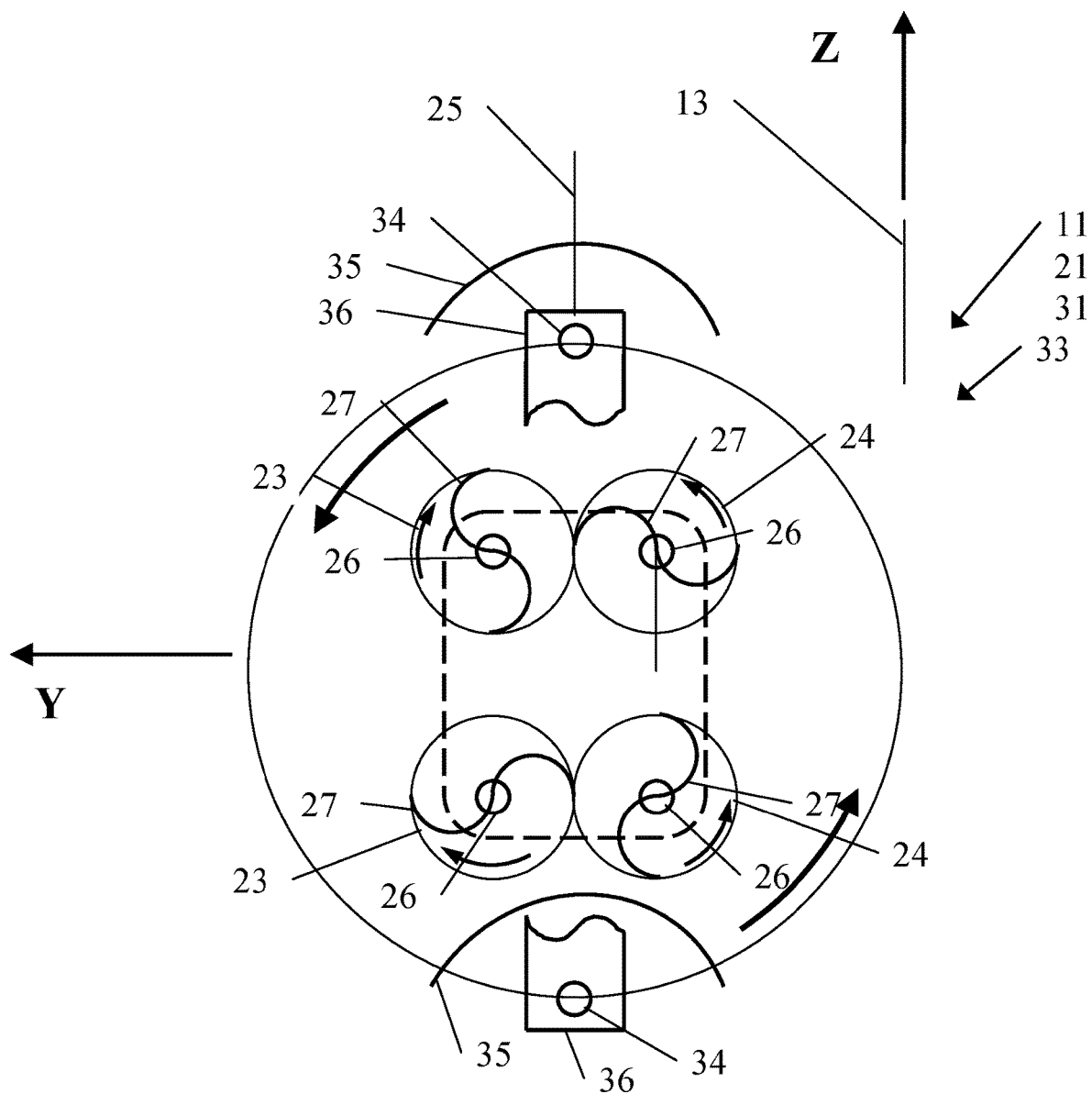
FIG. 3 is a partial cross section view of the preferred embodiment of the present invention taken along line 3-3 shown in FIG. 1.

Referring to FIGS. 1 thru 3, preferred embodiment 1 of the Light Weight Flying Car PPRW of the present invention, a propeller driven propulsion engine, is comprised of paired PPRW main-assemblies 11 and 12, mirror or clocked mirror images of one another separated by primary mirror image plane 13, where clocked mirror images were mirror images before they are clocked or rotated relative to one another, and mirror and clocked mirror images in rotations are images in counter-rotations. Paired PPRW main-assemblies 11 and 12 are on + and −Y side, respectively, given preferred embodiment 1 has X-Y-Z coordinate system, where X-Z plane lies in primary mirror image plane 13, +X axis points aft ward, +Z axis up, −Z axis down toward ground, and +Y axis is a horizontal radial line connecting two stationary central shafts 43 of paired PPRW main-assemblies 11 and 12 and orthogonal to X-Z plane. Paired PPRW main-assemblies 11 and 12 on + and −Y side are same as PPRW main-assemblies 11 and 12 on + and −Y side, respectively. Paired PPRW main-assemblies 11 and 12 on + and −Y side, respectively and correspondingly and concentrically, are in turn comprised of one paired sun rotor main-assemblies 21 and 22, one paired planet rotor main-assemblies 31 and 32, and one paired end mounting main-assemblies 41 and 42. Embodiment 1 is mounted through end mounting paired main-assembly 41 and 42 on top of external heavy road legal car 5 below and powered by its external heavy powerful engine assembly 51 that includes engine, transmission, fuel, and control systems. External heavy road legal car 5 and external heavy powerful engine assembly 51 are external and not part of embodiment 1 of the Light Weight Flying Car PPRW of the present invention.

Paired sun rotor main-assemblies 21 and 22 on + and −Y side, respectively, are mirror image of one another, each consisted of two paired outer and inner sun rotor sub-assemblies 23 and 24, respectively, mounted on a paired sun rotor end plates 29, and paired sun rotor sub-assemblies 23 and 24 are each in turn consisted of one sun rotating shaft 26, two sun airfoils 27, and one paired sun drive sprockets 28. Paired outer and inner sun rotor sub-assemblies 23 and 24 are clocked mirror images of one another, in counter-rotations, and separated by secondary mirror image plane 25; and they were mirror images before one is clocked 90 degrees. Paired outer and inner sun rotor sub-assemblies 23 and 24 are aligned side by side on a horizontal line parallel to the Y axis; and are respectively further away from and closer to the Z axis, and in clockwise and counter-clockwise rotations. Sun rotating shaft 26 and its two sun airfoils 27 extend in between paired sun rotor end plates 29 with two sun airfoils 27 fixed attached along and equally spaced in rotations around sun rotating shaft 26, and paired sun rotor end plates 29 fixed attached to sun rotating shaft 26. Sun rotating shaft 26 extends further out from paired sun rotor end plates 29 to be in between and fixed attached to paired sun drive sprockets 28. Sun airfoils 27 are curved segments in shape similar to a portion of a semi circle for high drag airfoils; and their semicircle chords are on radial lines from sun rotating shaft 26. Sun airfoils 27 in rotations around either paired outer and inner sun rotor sub-assemblies 23 and 24 are rotational images of one another. For sun airfoils 27 rotated horizontal in lines parallel to the Y axis and furthest away from the Z axis, sun airfoils 27 concave surfaces face and rotate +Z upward. Paired outer or inner sun rotor sub-assemblies 23 or 24 have appearances of pipes in profile oriented lengthwise along the X axis.

Paired planet rotor main-assemblies 31 and 32 on + and −Y side, respectively, are clocked mirror image of one another, but were mirror images before one is clocked 90 degrees. Paired planet rotor main-assemblies 31 and 32 rotate in orbital rotations counter-clockwise and clockwise, respectively, and are each consisted of two planet rotor sub-assemblies 33 equally spaced in orbital rotations 180 degrees apart and mounted on paired planet rotating end carrier plates 36. One planet rotor sub-assemblies 33 is in turn consisted of a planet rotor rotating shaft 34, a planet airfoil 35, and a paired planet drive sprockets 37. Planet rotating shaft 34 and planet airfoil 35 are extending in between paired planet rotating end carrier plate 36 with planet airfoil 35 fixed attached along and in rotations around planet rotating shaft 34, and planet rotating shaft 34 fixed attached to paired planet rotating end carrier plate 36. Planet rotating shaft 34 extends further out in between and fixed attached to paired drive sprockets 37. Planet airfoils 35 rotating with planet rotor sub-assemblies 33 are translational images in orbital rotations around their respective two paired sun rotor sub-assemblies 23 and 24 on + and −Y side. Planet airfoil 35 in a frontal view is a curved segment having a shape similar to a large portion of a semi-circle curved segment for a hybrid high lift and drag airfoil. Planet airfoils 35 concave surfaces in rotations persistently face −Z downward. Planet airfoil 35, when its curved segment chord is rotated horizontal on the Y axis, has an equivalent curved center point on a center line below the Y axis; and planet airfoil 35 curved segment chord width is substantially wider than sun airfoil 27 chord width. Paired planet rotor main-assemblies 31 and 32 shown in pipe profiles along X axis are represented by centerlines of planet rotor sub-assemblies 33 in orbital rotations around their respective paired sun rotor main-assemblies 21 and 22 on + and −Y side.

Paired end mounting main-assemblies 41 and 42 on + and —Y side, respectively, mirror image of one another, are each consisted of one stationary central shaft 43, one shared paired grounding plates 44, and one paired gear box and drive assembly 45. Stationary central shaft 43 extends in between and fixed attached to paired sun rotor end plates 29 supporting sun rotating shafts 26 of paired sun rotor main-assemblies 21 and 22. Beyond paired sun rotor end plates 29, stationary central shaft 43 extends in between and provides rotational support to paired planet rotating end carrier plates 36 of paired planet rotor main-assemblies 31 and 32. Next, stationary central shaft 43 extends in between and fixed attached to paired gear box and drive assemblies 45. Further beyond, stationary central shaft 43 extends in between and fixed attached to shared paired grounding plate 44 mounted on the external heavy road legal car 5 below. Gear box and drive chain assembly 45 connects paired main-assemblies 11 and 12 through sun drive sprockets 28 and planet drive sprockets 37 to and transmits and controls powers from external heavy powerful engine assembly 51 of external heavy road legal car 5 below for powering and controlling embodiment 1.

Preferred embodiment 1 of the Light Weight Flying Car PPRW of the present invention, mounted on top of external heavy road legal car 5 below, has means and provisions to be powered and controlled through external heavy powerful engine assembly 51 that includes engine, transmission, fuel, and control systems. Preferred embodiment 1 also has other means and provisions, such as gear box and drive assembly 45, to cooperate with external heavy powerful engine assembly 51 below for power transmissions and controls. Air flow patterns shaped by interacting sun airfoils 27 and planet airfoils 35 are controlled by such means as flow gates, diverters, ducts, and funnels as appropriate. These and other means and provisions required for preferred embodiment 1 are neither novel nor unique, and are not further described.

In operations, refer particularly to FIG. 3 in a frontal sectional view of PPRW main-assembly 11 on +Y side of preferred embodiment 1 of the Light Weight Flying Car PPRW of the present invention, a propeller driven propulsion engine for transforming external heavy road legal car 5 below into a true flying car. Gear box and drive assembly 45 connects and transmits powers from the external heavy powerful engine assembly 51 below for power transmissions and controls. Air flow patterns shaped by interacting sun airfoils 27 and planet airfoils 35 are controlled by such means as flow gates, diverters, ducts, and funnels as appropriate. These and other means and provisions required for preferred embodiment 1 are neither novel nor unique, and are not further described.

Sun rotor main-assembly 21 on +Y side viewing forward: Paired outer and inner sun rotor sub-assemblies 23 and 24 are powered to rotate clockwise and counter-clockwise, respectively. Sun airfoils 27 in rotations with paired outer and inner sun rotor sub-assemblies 23 and 24 propel air clockwise and counter-clockwise meeting at secondary mirror image plane 25 and produce an airflow field in a shape of two outer +Z upward airflows at outer distances away from secondary mirror image plane 25, one inner −Z downward airflows at inner distances centered at secondary mirror image plane 25, and +/−X transition sideway airflows at top and bottom in between two outer +Z upward and one inner −Z downward airflows. Sun airfoils 27 in rotations with two paired, instead of one paired, outer and inner sun rotor sub-assemblies 23 and 24 produce an airflow field shape that is stretched for two outer +Z upward airflows and one inner −Z downward airflows without much change to the top and bottom +/−X transition sideway airflows. Two outer +Z upward airflows and top and bottom +/−X transition sideway airflows from sun airfoils 27 interact strongly with planet airfoils 35 in orbital rotations around sun airfoils 27. The one inner −Z downward airflows centered at secondary mirror image plane 25 are effectively diverted downward away and around external heavy road legal car 5 below to produce −Z downward thrust and +Z upward thrust forces or Fz1 from sun airfoils 27 on +Y side.

Planet rotor main-assembly 31 on +Y side viewing forward: One planet airfoil 35 concave surface is persistently facing −Z downward in rotations with one orbiting planet rotor sub-assembly 33 in counter-clockwise orbital rotations around sun airfoils 27. In one orbital rotation, planet airfoils 35 rotates through a reciprocal half a rotation power and return cycles, separated by secondary mirror image plane 25, for being furthest away from and closest to the Z axis, respectively; and planet airfoils 35 are rotated in −Z downward and +Z upward velocity in half a rotation power and return cycles, respectively. At midpoint of power cycles, planet airfoils 35 are rotated on the Y axis in maximum −Z downward velocities, and moving against and pressured by the outer +Z upward airflows produced by sun airfoils 27. Pressure and pressure forces against planet airfoils 35 are proportional to airflow velocities squared; and planet airfoils 35 move effectively at much higher relative velocities to generate greatly increased maximum airflow pressure forces or +Z upward thrust forces Fz2 at midpoint of power cycles for planet airfoils 35 on +Y side. In contrast, at the midpoint of return cycles planet airfoils 35 are also rotated on the Y axis, but in maximum +Z upward velocity in moving along at the same direction as the outer +Z upward airflows produced by sun airfoils 27. Planet airfoils 35 move effectively at much lower relative velocities to generate greatly reduced maximum resistance pressure forces or −Z downward thrust forces Fz3 at midpoint of return cycles for planet airfoils 35 on +Y side. Transiting through the top and bottom portion of the power and return cycles, high lift and drag hybrid planet airfoils 35 are substantially in sideways +/−Y motions, and subjected to top and bottom substantially sideways +/−X transition airflows surrounding sun airfoils 27. Planet airfoils 35 are travelling through +/−X transition airflows at variable angles of attack to generate substantial +Z upward lift or thrust forces Fz4 in +/−X transition airflows between power and return cycles for planet airfoils 35 on +Y side.

Light Weight Flying Car PPRW of the present invention, a propeller driven propulsion engine, produce great propulsion performances by shaping airflow fields of sun airfoils 27 and changing relative velocities of interacting sun airfoils 27 and planet airfoils 35. The propulsion performances are overwhelmingly dominated by the performances of high lift and drag hybrid planet airfoils 35, rotating in part as rotary wings, and having much larger planet airfoils 35 orbiting at a much greater radius than sun airfoils 27 in generating propelled air for thrust and lift forces. Sun and planet airfoils 27 and 35 interacting in rotations produce propelled air for thrust and lift forces totaling Fz, total for the true flying car; and Fz, total is represented by a proportional of the sum total of 2 X (Fz1) for all sun airfoils 27+2 X (Fz2+Fz3+Fz4) for all planet airfoils 35 of paired PPRW main-assemblies 11 and 12 on + and −Y side. When vectored, the total propelled air for thrust and lift forces Fz, total are turned into variable lift and thrust forces for takeoffs, landings, and air flights of the true flying car travelling in the airways.

The preferred embodiment described above is for the purpose of describing features and technical conceptions of a simplified Light Weight Flying Car PPRW of the present invention, a propeller driven propulsion engine in a pipe profile. But it should be readily apparent that the invention is not limited to the described preferred embodiment alone, and a person skilled in the art may come up with various changes and modifications consistent to the technical concept disclosed herein and within the spirit and scope of the invention. Prime examples of modifications and optimizations to the described preferred embodiment include: the numbers and sizes of planet and sun rotors main-assemblies and sub-assemblies; the shapes, sizes, center points, numbers, and types (lift, drag, or hybrid) of planet and sun airfoils; high lift and drag hybrid planet airfoils assembled from segmented main body, leading edge slats, and trailing edge flaperons; reorienting the Flying Car PPRW direction from forward-aft to sideways, and the paired sun rotor prime-assemblies by clocking or rotating around stationary central shafts; and inclusions of such provisions as airflow gates, diverters, ducts, and funnels for shaping airflow patterns. Where stated, "air" is broadly meant to be any fluid medium, including water. Required means, provisions, and systems for powering and vectoring propelled thrust and lift forces—such as power motors and engines, transmission, fuel, mechanisms, and controls systems—that are neither novel nor unique systems, are not described in detail for the preferred embodiment of the present invention. Therefore, it is to be understood that modifications and variations may be utilized without departure from the spirit and scope of the invention disclosed herein, as those skilled in the art will readily understand. Such modifications and variations are considered to be within the purview and scope of the claimed invention and their equivalents.

I claim:

1. A flying car, comprising:
    a car;
    a rotary wing attached to a top of said car, said rotary wing comprising;
        a first and a second main assembly, each said main assembly comprising;
        a central shaft;
        a planet rotor main assembly, said central shaft extends through a longitudinal axis of said planet rotor main assembly;
        a carrier plate mounted on said central shaft between an end of said planet rotor main assembly and an end of said central shaft, said carrier plate extending substantially perpendicular to a longitudinal axis of said central shaft and having a first end and a second end;
        a first planet airfoil attached to said first end of said carrier plate and a second planet airfoil attached to said second end of said carrier plate;
        a sun rotor end plate attached to said central shaft such that said carrier plate is between said sun rotor end plate and said end of said central shaft;
        two pairs of paired sun rotor assemblies attached to said sun rotor end plate, wherein a first rotor assembly in each of said two pairs of paired sun rotor assemblies is configured to rotate in an opposite direction from a second rotor assembly in each of said two pairs of paired sun rotor assemblies;
    whereby rotation of said first main assembly and said second main assembly is configured to generate lift of said vehicle.

* * * * *